US007218505B2

(12) United States Patent
Naito et al.

(10) Patent No.: US 7,218,505 B2
(45) Date of Patent: May 15, 2007

(54) CHIP SOLID ELECTROLYTE CAPACITOR

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 4 days.

(21) Appl. No.: 10/547,417

(22) PCT Filed: Mar. 2, 2004

(86) PCT No.: PCT/JP2004/002573

§ 371 (c)(1),
(2), (4) Date: Aug. 31, 2005

(87) PCT Pub. No.: WO2004/079760

PCT Pub. Date: Sep. 16, 2004

(65) Prior Publication Data
US 2006/0146481 A1    Jul. 6, 2006

Related U.S. Application Data

(60) Provisional application No. 60/453,823, filed on Mar. 12, 2003.

(30) Foreign Application Priority Data

Mar. 3, 2003   (JP)   ............................. 2003-056237

(51) Int. Cl.
*H01G 9/00* (2006.01)

(52) U.S. Cl. ............... 361/523; 361/525; 361/528; 361/529; 361/534; 29/25.01; 29/25.03

(58) Field of Classification Search ........ 361/523–528, 361/529–534, 502–519; 29/25.03, 25.01
See application file for complete search history.

(56) References Cited

U.S. PATENT DOCUMENTS 6,226,173 B1 * 5/2001 Welsch et al. ............... 361/508
6,307,735 B1 * 10/2001 Saito et al. .................. 361/517
6,421,227 B2 * 7/2002 Nitoh et al. ................. 361/523
6,515,847 B1 * 2/2003 Naraya ........................ 361/523
6,914,769 B2 * 7/2005 Welsch et al. .............. 361/508
7,087,292 B2 * 8/2006 Sakai et al. ................. 428/209

FOREIGN PATENT DOCUMENTS

EP            1202301 A1    5/2002
JP          5-234829 A      9/1993
WO       WO 00/75943 A1   12/2000

OTHER PUBLICATIONS

Erik K. Reed, et al., "Lowest ESR Tantalum Chip Capacitor", Carts-Europe, European Passive Components Symposium, XX, XX, Oct. 1998, pp. 97-105, XP008030596.

* cited by examiner

*Primary Examiner*—Nguyen T. Ha
(74) *Attorney, Agent, or Firm*—Sughrue Mion, PLLC

(57) ABSTRACT

A chip solid electrolyte capacitor with low ESR and small initial failure ratio comprising a plurality of solid electrolyte capacitor elements each produced by stacking a dielectric oxide film layer, a semiconductor layer and an electrically conducting layer in this order to form a cathode part on a surface of an anode substrate exclusive of the anode part at one end, the anode substrate comprising a sintered body of a valve-acting metal or an electrically conducting oxide or comprising the sintered body connected with a metal wire, which is a chip solid electrolyte capacitor obtained by horizontally laying the plurality of electrolyte capacitor elements in parallel with no space on a pair of oppositely disposed end parts of a lead frame such that the anode part or the metal wire and the cathode part come into contact with the lead frame, joining each element, and molding the entire with a resin while leaving outside the external terminal parts of the lead frame, wherein the volume ratio of one sintered body exclusive of the anode part to the chip volume is from 0.042 to 0.110; and an electronic instrument using the chip solid electrolyte capacitor.

18 Claims, 2 Drawing Sheets

CHIP SOLID ELECTROLYTE CAPACITOR

CROSS REFERENCE TO THE RELATED APPLICATIONS

This is an application filed pursuant to 35 U.S.C. Section 111(a) with claiming the benefit of U.S. Provisional application Ser. No. 60/453,823 filed Mar. 12, 2003 under the provision of 35 U.S.C. Section 111(b), pursuant to 35 U.S.C. Section 119(e)(1).

TECHNICAL FIELD

The present invention relates to a chip solid electrolyte capacitor having excellent properties with low equivalent series resistance (ESR) and small initial defective ratio of the leakage current (LC value).

BACKGROUND ART

FIG. 3 is a perspective view showing the structure of a conventionally known chip solid electrolyte capacitor, where one solid electrolyte capacitor element (2) obtained by sequentially forming a dielectric oxide film layer, a semiconductor layer and an electrically conducting layer on a surface of a sintered body comprising a valve-acting metal or an electrically conducting oxide is used and where a part of the electrically conducting layer and an anode lead (4a) (anode part) connected to the sintered body are laid on a pair of oppositely disposed end parts (1a and 1b) which are a part of a plate-like metal-made lead frame (1) working out to external terminals, each is electrically or mechanically connected, the entirety is molded with a jacket resin while leaving outside only the external terminals of the lead frame to form a jacket part (5), and the lead frame outside the jacket part is cut and bent at predetermined portions.

On the other hand, with recent progress of high-frequency processing of electronic instruments, the solid electrolyte capacitor is also demanded to have good high-frequency performance. The present inventors have already proposed in JP-A-5-234829 (the term "JP-A" as used herein means an "unexamined published Japanese patent application") a chip solid electrolyte capacitor exhibiting good high-frequency performance values, where a plurality of solid electrolyte capacitor elements each obtained by sequentially stacking a dielectric oxide film layer, a semiconductor layer and an electrically conducting layer to form a cathode part on a surface of an anode substrate having an anode part and comprising a valve-acting metal are used and where the cathode parts are partially laid in parallel with no space on one end part of a lead frame having a pair of oppositely disposed end parts, the anode parts are laid on another end part, each is electrically or mechanically joined, the entirety is molded with a resin while leaving outside a part of end parts of the lead frame, and the lead frame outside the resin molding is cut and bent at predetermined portions.

The chip solid electrolyte capacitor is integrated on a substrate together with other electronic parts, then mounted on an electronic instrument and used for multiple years. The chip solid electrolyte capacitor is demanded to exhibit an initial failure ratio as low as possible at the stage of being integrated on a substrate.

DISCLOSURE OF THE INVENTION

When the above-described chip solid electrolyte capacitor with good high-frequency performance is mass-produced, some capacitors turn out to be defective in the initial failure ratio (particularly LC value) at the solder-packaging on a substrate.

As a result of intensive investigations to solve these problems, the present inventors have found that when a chip solid electrolyte capacitor is manufactured by using a sintered body specified in the volume ratio of one sintered body exclusive of the anode part to the chip volume, the chip solid electrolyte capacitor manufactured can be low in the initial failure ratio and moreover, small in the ESR value. The present invention has been accomplished based on this finding.

That is, the present invention relates to the following chip solid electrolyte capacitor and electronic instruments using the chip solid electrolyte capacitor.

1. A chip solid electrolyte capacitor comprising a plurality of solid electrolyte capacitor elements each produced by stacking a dielectric oxide film layer, a semiconductor layer and an electrically conducting layer in this order to form a cathode part on a surface of an anode substrate exclusive of the anode part at one end, the anode substrate comprising a sintered body of a valve-acting metal or an electrically conducting oxide or comprising the sintered body connected with a metal wire, which is a chip solid electrolyte capacitor obtained by horizontally laying the plurality of electrolyte capacitor elements in parallel with no space on a pair of oppositely disposed end parts of a lead frame such that the anode part and the cathode part come into contact with the lead frame, joining each element, and molding the entirety with a resin while leaving outside the external terminal parts of the lead frame, wherein the volume ratio of one sintered body exclusive of the anode part to the chip volume is from 0.042 to 0.110.

2. The chip solid electrolyte capacitor as described in 1 above, wherein the anode part comprises the distal end of the anode substrate.

3. The chip solid electrolyte capacitor as described in 1 above, wherein the anode part comprises the metal wire connected to the sintered body.

4. The chip solid electrolyte capacitor as described in 3 above, wherein the metal wire is selected from the group consisting of tantalum, niobium, aluminum, titanium, alloys mainly comprising such a metal, and these metals and alloys which are partially oxidized and/or nitrided.

5. The chip solid electrolyte capacitor as described in 1 above, wherein the valve-acting metal or electrically conducting oxide is tantalum, aluminum, niobium, titanium, an alloy mainly comprising such a valve-acting metal or niobium oxide, or a mixture of two or more members selected from these valve-acting metals, alloys and electrically conducting oxides.

6. The chip solid electrolyte capacitor as described in 4 above, wherein the valve-acting metal, alloy or electrically conducting oxide is subjected to at least one treatment selected from carbidation, phosphation, boronation, nitridation and sulfidation.

7. The chip solid electrolyte capacitor as described in 1 above, wherein the sintered body has a chemically and/or electrically etched surface.

8. The chip solid electrolyte capacitor as described in 1 above, wherein the boundary between the anode part and the part exclusive of the anode part of the anode substrate is insulated by an insulating resin.

9. The chip solid electrolyte capacitor as described in 1 above, wherein the dielectric oxide film layer mainly comprises at least one member selected from $Ta_2O_5$, $Al_2O_3$, $Zr_2O_3$ and $Nb_2O_5$.

10. The chip solid electrolyte capacitor as described in 1 above, wherein the semiconductor layer is at least one member selected from an organic semiconductor layer and an inorganic semiconductor layer.

11. The chip solid electrolyte capacitor as described in 10 above, wherein the organic semiconductor is at least one member selected from an organic semiconductor comprising benzopyrroline tetramer and chloranile, an organic semiconductor mainly comprising tetrathiotetracene, an organic semiconductor mainly comprising tetracyano-quinodimethane, and an organic semiconductor mainly comprising an electrically conducting polymer obtained by doping a dopant to a polymer containing a repeating unit represented by the following formula (1) or (2):

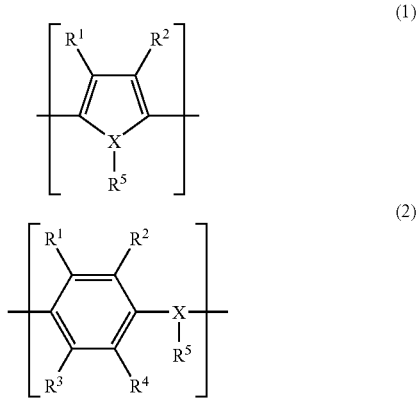

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a cyclic structure.

12. The chip solid electrolyte capacitor as described in 11 above, wherein the electrically conducting polymer containing a repeating unit represented by formula (1) is an electrically conducting polymer containing a structure unit represented by the following formula (3) as a repeating unit:

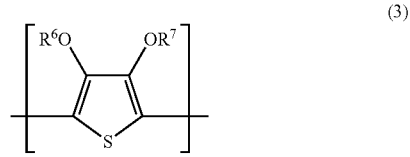

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position, and the cyclic structure includes a structure having a vinylene bond which may be substituted, and a phenylene structure which may be substituted.

13. The chip solid electrolyte capacitor as described in 11 above, wherein the electrically conducting polymer is selected from polyaniline, polyoxyphenylene, polyphenylene sulfide, polythiophene, polyfuran, poly-pyrrole, polymethylpyrrole, and substitution derivatives thereof.

14. The chip solid electrolyte capacitor as described in 13 above, wherein the electrically conducting polymer is poly (3,4-ethylenedioxythiophene).

15. The chip solid electrolyte capacitor as described in 10 above, wherein the inorganic semiconductor is at least one compound selected from molybdenum dioxide, tungsten dioxide, lead dioxide and manganese dioxide.

16. The chip solid electrolyte capacitor as described in 10 above, wherein the electrical conductivity of the semiconductor is from $10^{-2}$ to $10^3$ S/cm.

17. An electronic circuit using the chip solid electrolyte capacitor described in any one of 1 to 16 above.

18. An electronic instrument using the chip solid electrolyte capacitor described in any one of 1 to 16 above.

MODE FOR CARRYING OUT THE INVENTION

Figure 1:
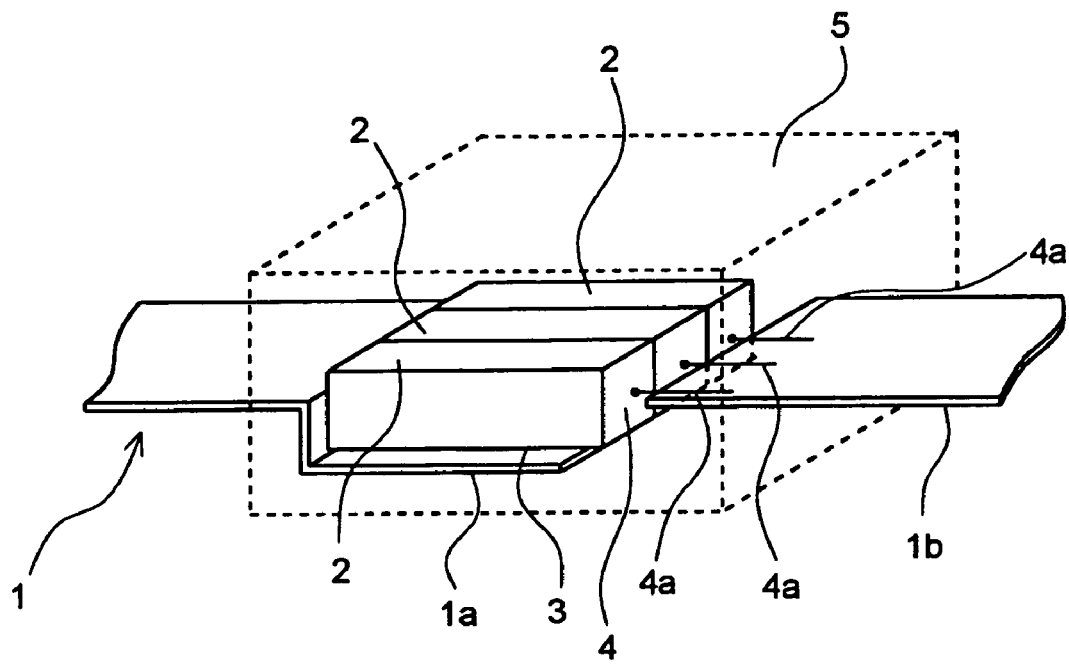
FIG. 1 is a perspective view showing an example of a chip solid electrolyte capacitor of the present invention where three solid electrolyte capacitor elements each having an anode lead (anode part) are laid in parallel with no space on one end part of a lead frame.

One embodiment of the chip solid electrolyte capacitor of the present invention is described by referring to the drawings.

FIG. 1 is a perspective view showing one example of the chip solid electrolyte capacitor of the present invention. In this example, three solid electrolyte capacitor elements (2) each prepared by stacking a dielectric oxide film layer, a semiconductor layer and an electrically conducting layer in this order to form a cathode part (3) on a surface of an anode substrate (4) comprising a valve-acting metal or an electrically conducting oxide and being connected with an anode part lead are used, and the chip solid electrolyte capacitor has a structure such that the cathode parts are partially laid in parallel with no space on one end part (1a) of a pair of oppositely disposed end parts of a lead frame (1), the anode part leads (4a) are laid on another end part (1b), each is electrically or mechanically joined, the entirety is molded with a resin while leaving outside the external terminal parts of the lead frame (1), and the lead frame is cut and bent at predetermined portions (not shown) outside the resin molding.

Figure 2:
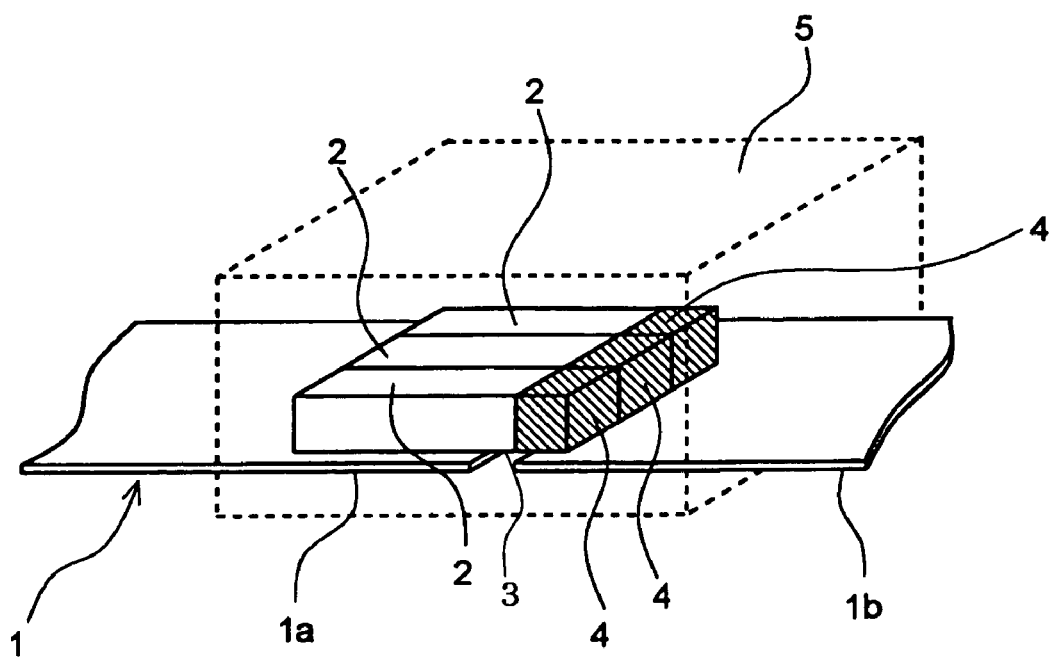
FIG. 2 is a perspective view showing another example of a chip solid electrolyte capacitor of the present invention where three solid electrolyte capacitor elements each having an anode part in the sintered body itself are laid in parallel with no space on one end part of a lead frame.
Figure 3:
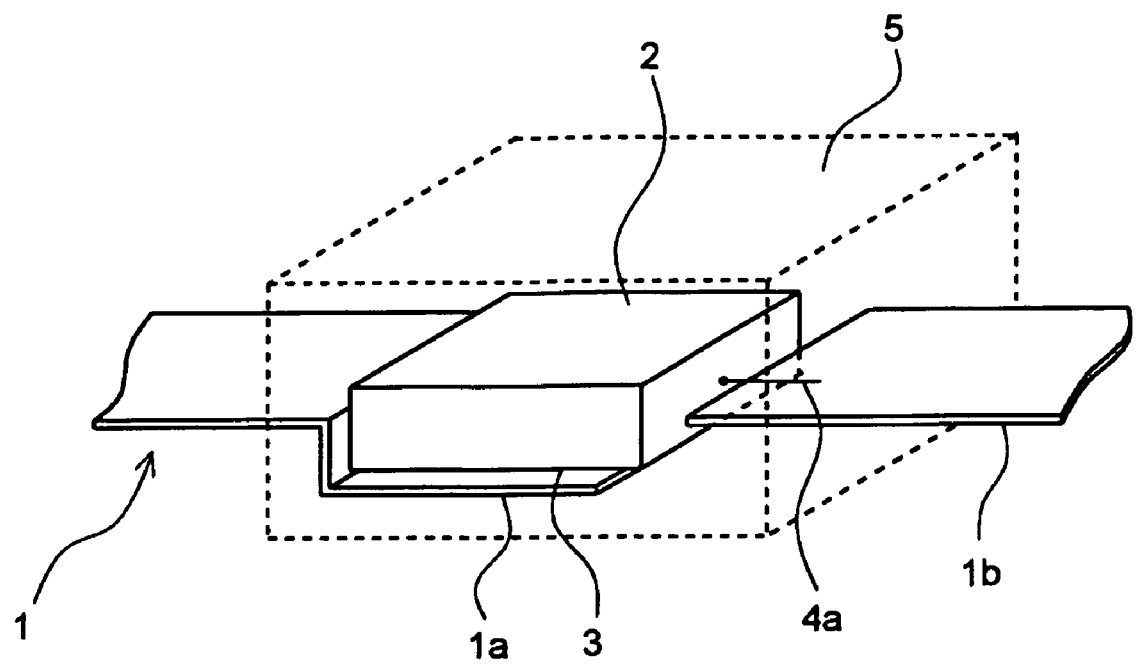
FIG. 3 is a perspective view showing a conventional example of a chip solid electrolyte capacitor where a solid electrolyte capacitor element is laid on one end part of a lead frame.

FIG. 2 is a perspective view showing another example of the chip solid electrolyte capacitor of the present invention. In this example, three solid electrolyte capacitor elements (2) each prepared by stacking a dielectric oxide film layer, a semiconductor layer and an electrically conducting layer in this order on a surface of an anode substrate comprising a valve-acting metal or an electrically conducting oxide to form a cathode part (3) while allowing an anode part (4) to remain at the end of the solid electrolytic capacitor element are used, and the chip solid electrolyte capacitor has a structure such that the cathode parts (3) are laid in parallel with no space on one end part (1a) of a pair of oppositely disposed end parts of a lead frame (1), the anode part parts (4) are laid on another end part (1b), each is electrically or mechanically joined, the entirety is molded with a resin while leaving outside the external terminal parts of the lead frame (1), and, similarly to the example of FIG. 1, the lead frame is cut and bent at predetermined portions outside the resin molding.

Examples of the valve-acting metal or electrically conducting oxide for use in the present invention include tantalum, aluminum, niobium, titanium, an alloy mainly comprising such a valve-acting metal (50% by mass or more of the component) or niobium oxide, and a mixture of two or more members selected from these valve-acting metals, alloys and electrically conducting oxides. The valve-acting metal, alloy or electrically conducting compound may be partially subjected to at least one treatment selected from carbidation, phosphation, boronation, nitridation and sulfidation before use.

The anode substrate for use in the present invention is a sintered body obtained by shaping the powder of valve-acting metal or electrically conducting oxide and then sintering it. The surface area of the sintered body can be varied by appropriately selecting the shaping pressure and sintering conditions (temperature and time). In order to more increase the surface area of the sintered body after sintering, the surface of the sintered body may be chemically and/or electrically etched.

In the present invention, a part of the anode substrate (4) is used as the anode part. As shown in FIG. 2, the distal end of the anode substrate may be used as the anode part or as shown in FIG. 1, a metal wire (4a) may be connected to a part of the anode substrate and used as the anode part. The metal wire may be connected after the sintered body is produced, or a part of the metal wire may be embedded at the shaping before the production of the sintered body and then sintered, thereby establishing the connection. Examples of the metal wire include tantalum, niobium, aluminum, titanium, alloys mainly comprising such a metal, and these metals and alloys which are partially oxidized and/or nitrided.

The metal wire is usually a fine wire of 1 mm or less. For the purpose of preventing the semiconductor layer described later from attaching to the portion serving as the anode part to cause short-circuiting of the capacitor, the anode part and the remaining part of the anode substrate may be insulated by attaching an insulating resin like a hair band to the boundary therebetween.

In the present invention, examples of the dielectric oxide film layer formed on the anode substrate surface exclusive of the anode part (the dielectric layer may exist in the entirety or part of the anode part) include a dielectric layer mainly comprising at least one member selected from metal oxides such as $Ta_2O_5$, $Al_2O_3$, $Zr_2O_3$ and $Nb_2O_5$. The dielectric layer can be obtained by electrochemically forming the anode substrate in an electrolytic solution. Also, as described in International Publication WO00/75943 filed by the present applicant, a dielectric layer obtained by mixing a dielectric layer mainly comprising at least one member selected from metal oxides and a dielectric layer for use in ceramic capacitors may be used.

Representative examples of the semiconductor layer formed on the dielectric layer of the present invention include at least one compound selected from organic semiconductors and inorganic semiconductors. Specific examples of the organic semiconductors include an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

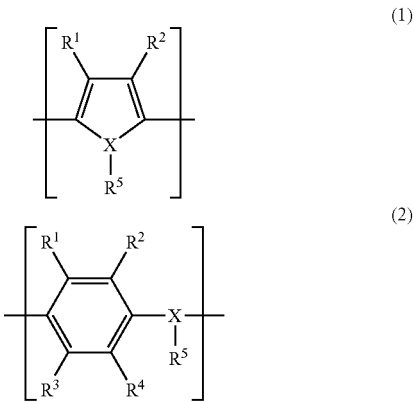

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a cyclic structure.

Preferred examples of the electrically conducting polymer containing a repeating unit represented by formula (1) include an electrically conducting polymer containing a structure unit represented by the following formula (3) as a repeating unit:

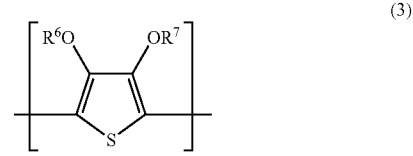

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position, and the cyclic structure includes a structure having a vinylene bond which may be substituted, and a phenylene structure which may be substituted.

The electrically conducting polymer containing such a chemical structure is being electrically charged and a dopant is doped therein. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide.

When the organic or inorganic semiconductor used has an electrical conductivity of $10^{-2}$ to $10^3$ S/cm, the capacitor manufactured can have a small ESR value and this is preferred.

In the present invention, an electrically conducting layer is provided on the semiconductor layer formed by the above-described method or the like. The electrically conducting layer can be formed, for example, by the solidification of an electrically conducting paste, plating, metallization, or adhesion of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the anode substrate having formed thereon the semiconductor layer.

In this way, a solid electrolyte capacitor element where layers up to the electrically conducting layer are stacked on the anode substrate to form the cathode part is manufactured.

In the manufacture of the chip solid electrolyte capacitor of the present invention, a plurality of the thus-manufactured solid electrolyte capacitor elements are prepared, the cathode parts of respective solid electrolyte capacitor elements are partially laid in parallel with no space on one end part of a separately prepared lead frame having a pair of oppositely disposed end parts, the anode parts of anode substrates are laid on another end part, each is electrically or mechanically joined, for example, by solidification of an electrically conducting paste for the former and by spot-welding for the latter, the entirety is molded with a resin while leaving outside the portions working out to external terminals of the lead frame, and the lead frame is cut and bent at predetermined portions outside the resin molding. More specifically, as shown in FIG. 1, for example, three solid electrolyte capacitor elements are laid in parallel with no space on a pair of oppositely disposed end parts of a lead frame and molded to manufacture one chip solid electrolyte capacitor having an angular shape, usually a rectangular parallelopiped shape. At the manufacture of such a solid electrolyte capacitor, a notched part may be provided on a part of the side face and/or the bottom face to form a site for housing the lead frame after cutting, a notched part may be provided, for example, on the top face so as to distinguish the anode and the cathode, or the top face and/or the bottom face may be tapered at a certain angle to facilitate the release of the manufactured chip solid electrolyte capacitor from the metal mold at the molding with resin.

The lead frame is cut as described above and finally works out to external terminals of the chip solid electrolyte capacitor. The shape thereof is a foil or plate form and the construction material is iron, copper, aluminum or an alloy mainly comprising such a metal. The lead frame may be partially or entirely plated with solder, tin, titanium or the like. Between the lead frame and the plating, a primer plating such as nickel may be provided. The lead frame is disposed such that the two sides of the frames face each other while leaving a gap therebetween, and the gap insulates the anode part from the cathode part of each solid electrolyte capacitor element.

In the chip solid electrolyte capacitor of the present invention, when the volume ratio of one sintered body exclusive of the anode part to the volume of the chip capacitor is set to from 0.042 to 0.110, preferably from 0.050 to 0.100, more preferably from 0.070 to 0.092, a good chip solid electrolyte capacitor with small ESR and low initial failure ratio of LC value can be manufactured. If this volume ratio is less than 0.042, the initial failure ratio of LC value becomes large, whereas if the volume ratio exceeds 0.110, bad ESR (100 kHz) results. In conventional solid electrolyte capacitors, it is empirically known that as the capacitor element within the molding is smaller, the initial failure ratio tends to be lower. However, this is reversed in the chip solid electrolytic capacitor of the present invention where a plurality of solid electrolytic capacitor elements are laid in parallel with no space. It is attributed to the stress that the capacitor elements receive from the molded resin, which differs depending on the status of the placement of the elements. On the other hand, the ESR is a function of the distance between the center of the anode substrate and the electrically conducting layer and therefore, this is proportional to the size of the capacitor element within the molding. Accordingly, when the volume of the capacitor element is adjusted using the above-mentioned volume ratio as a guide, a capacitor being excellent in both of the above properties can be obtained.

As for the resin used in molding the chip solid electrolyte capacitor of the present invention, known resins for use in molding a chip solid electrolyte capacitor, such as epoxy resin, phenol resin and alkyd resin, can be used. The production machine for performing the molding with resin is preferably a transfer machine.

The present invention can be suitable applied to the capacitors in a chip size in general use, specifically in a chip size of 7.3×4.3×1.0 mm, 7.3×4.3×1.8 mm, 7.3×4.3×2.8 mm, 7.3×4.3×3.8 mm, 6.0×3.2×1.0 mm, 6.0×3.2×1.8 mm, 6.0× 3.2×2.8 mm and 6.0×3.2×3.8 mm in length, width and height.

The chip solid electrolyte capacitor of the present invention can be preferably used for circuits using a high-capacitance capacitor, such as voltage stabilizing circuit and noise removing circuit. These circuits can be used in various digital instruments such as a personal computer, server, camera, game machine, DVD, AV equipment and cellular phone, and electrical instruments such as various power sources. The chip solid electrolyte capacitor manufactured in the present invention is low in the initial failure ratio and therefore, by using this chip solid electrolyte capacitor, electronic circuits and electronic instruments having a low initial failure ratio can be obtained.

BEST MODE FOR CARRYING OUT THE INVENTION

The present invention is described in greater detail by referring to Examples, however, the present invention is not limited to these Examples.

In Examples, the chip solid electrolyte capacitor manufactured was solder-packaged under the conditions of having the capacitor pass three times through a reflow furnace set to take a temperature pattern having a peak at 260° C. (standing at 150° C. for 40 seconds and after elevating the temperature, standing at 230° C. or more for 30 seconds). After the packaging, the LC was measured at 4 V for 30 seconds. The number of units was n=320 in each measurement and those having an LC value of 0.1 CV or less were judged acceptable.

EXAMPLES 1 TO 3 AND COMPARATIVE EXAMPLES 1 AND 2

By using tantalum powder having CV (product of capacitance and electrochemical voltage) of 50,000/g, sintered bodies in a size of 4.0×W×1.8 mm were produced as shown in Table 1 (the mass of tantalum and the dimension (W mm) are shown in Table 1; sintering temperature: 1,420° C., sintering time: 20 minutes, density of sintered body: 6.4 g/cm$^3$, Ta lead wire: 0.24 mmφ; a part of Ta lead wire was embedded in the sintered body to run in parallel to the longitudinal direction of 4 mm and the lead wire part protruded from the sintered body was used as the anode part). The sintered body to serve as the anode was dipped in an aqueous 0.1% phosphoric acid solution excluding a part of the lead wire and electrochemically formed at 80° C. for 3 hours by applying a voltage of 18 V between the anode and the Ta plate electrode as the cathode to form a dielectric oxide film layer composed of Ta$_2$O$_5$. Then, an operation of dipping this sintered body excluding the lead wire in a 1:1 mixed solution of an aqueous 20% lead acetate solution and an aqueous 35% ammonium persulfate solution, allowing it to stand at 40° C. for 1 hour, and then pulling out, water-washing and drying the sintered body was repeated 25 times to form a semiconductor layer composed of a lead dioxide and lead sulfate mixture (lead dioxide: 96%) on the dielectric oxide film layer. On the semiconductor layer, carbon paste and silver paste were sequentially stacked to complete the cathode part, thereby manufacturing a solid electrolyte capacitor element.

On a pair of end parts of a separately prepared 100 μm-thick copper alloy lead frame having a tin-plated surface (32 paired end parts each in a width of 3.4 mm were present; the end part on which the cathode part was laid had a step of 0.9 mm corresponding to the step in FIG. 1 and the portion where the cathode part was laid had a length of 4.3 mm; when coplanarly projected, a gap of 1 mm was present between both end parts), three solid electrolyte capacitor elements manufactured above were connected in parallel with no space horizontally (the cathode side of the solid electrolyte capacitor elements, namely, the 4.0×W face of the sintered body was laid on the end part having a step and the anode side of the solid electrolyte capacitor element was laid on another end part; each was electrically or mechanically connected by solidification of silver paste to the former and by spot-welding to the latter; in one lead frame, three solid electrolyte capacitor elements were connected on each pair of end parts and 96 solid electrolyte capacitor elements were connected in total). Thereafter, a part of both end parts of lead frame and the solid electrolyte capacitor elements were molded by transfer molding with epoxy resin to manufacture a chip solid electrolyte capacitor in a size of 7.3×4.3×2.8 mm (after molding, both end parts outside the molding each was cut at the position of 3.4 mm from the end face of the molding, the frame cut out was removed and the end parts of the frame connected to the chip solid electrolyte capacitor and remaining outside each was bent along the outer circumference of the capacitor and used as the external terminal; from one lead frame, 32 chip solid electrolyte capacitors were manufactured).

EXAMPLES 4 TO 6 AND COMPARATIVE EXAMPLE 3

Chip solid electrolyte capacitors were manufactured in the same manner as in Example 1 except for changing the CV value of the sintered body to 80,000/g, the dimension of the sintered body to 4.0×W×1.0 mm, the sintering temperature to 1,340° C., the sintering time to 30 minutes, the density of sintered body to 5.6 g/cm$^3$, the semiconductor layer to polypyrrole (formed by repeating 55 times an operation of alternately dipping the sintered body in a 5% pyrrole alcohol solution and in a mixed aqueous solution of 0.1% anthraquinonesulfonic acid and 10% ammonium persulfate and performing the reaction at 40° C.), the step of the lead frame to 0.5 mm, the chip shape to 7.3×4.3×1.8 mm and the cutting position after molding to 2.9 mm.

EXAMPLES 7 TO 9 AND COMPARATIVE EXAMPLE 4

Chip solid electrolyte capacitors were manufactured in the same manner as in Example 1 except for changing the dimension of the sintered body to 4.0×W×2.5 mm, the semiconductor layer to polyethylenedioxythiophene (formed by dipping the sintered body in an aqueous solution of ethylenedioxythiophene and anthraquinonesulfonic acid, each dissolved in a very small amount, and performing the electrolytic polymerization for 170 hours), the step of the lead frame to 1.3 mm, the chip shape to 7.3×4.3×3.5 mm and the cutting position after molding to 3.8 mm.

The dimension W of each chip solid electrolyte capacitor manufactured above, the volume ratio of one sintered body exclusive of the anode part to the chip volume, the capacitance, the capacitance per mass of the entire sintered body used in the capacitor, ESR (100 kHz) and the non-defective ratio of LC after packaging on a substrate (LC of 0.1 CV or less was judged acceptable; the voltage at this time was 4 V) are shown in Table 1. The capacitance and ESR each is an average of n=320 units.

TABLE 1

|  |  | W, mm | Volume Ratio | Capacitance, μF | Capacitance/Mass, μF/g | ESR, mΩ | Failure Ratio |
|---|---|---|---|---|---|---|---|
| Example | 1 | 0.6 | 0.049 | 180 | 2120 | 21 | 0/320 |
|  | 2 | 1.0 | 0.082 | 290 | 2100 | 16 | 0/320 |
|  | 3 | 1.2 | 0.098 | 340 | 2050 | 13 | 0/320 |
|  | 4 | 0.6 | 0.042 | 130 | 3280 | 22 | 0/320 |
|  | 5 | 1.0 | 0.071 | 220 | 3240 | 20 | 0/320 |

TABLE 1-continued

|  |  | W, mm | Volume Ratio | Capacitance, μF | Capacitance/Mass, μF/g | ESR, mΩ | Failure Ratio |
|---|---|---|---|---|---|---|---|
|  | 6 | 1.2 | 0.085 | 250 | 3160 | 17 | 0/320 |
|  | 7 | 0.6 | 0.055 | 240 | 2080 | 17 | 0/320 |
|  | 8 | 1.0 | 0.091 | 400 | 2080 | 13 | 0/320 |
|  | 9 | 1.2 | 0.109 | 470 | 2040 | 12 | 0/320 |
| Comparative Example | 1 | 0.5 | 0.041 | 150 | 2130 | 26 | 3/320 |
|  | 2 | 1.4 | 0.114 | 400 | 2040 | 41 | 0/320 |
|  | 3 | 0.5 | 0.035 | 110 | 3360 | 27 | 4/320 |
|  | 4 | 1.3 | 0.118 | 500 | 2000 | 38 | 0/320 |

It is seen from the comparison between Examples 1 to 3 and Comparative Examples 1 and 2, between Examples 4 to 6 and Comparative Example 3, and between Examples 7 to 9 and Comparative Example 4 that when the volume ratio of one sintered body exclusive of the anode part to the chip volume is from 0.042 to 0.110, a chip solid electrolyte capacitor with lower ESR and smaller failure ratio can be manufactured compared to the similar capacitors except the volume ratio.

INDUSTRIAL APPLICABILITY

The present invention provides a chip solid electrolyte capacitor where the volume ratio of one sintered body exclusive of the anode part to the chip volume is from 0.042 to 0.110. According to the present invention, a chip solid electrolyte capacitor with low ESR and small initial failure ratio can be obtained.

The invention claimed is:

1. A chip solid electrolyte capacitor comprising a plurality of solid electrolyte capacitor elements each produced by stacking a dielectric oxide film layer, a semiconductor layer and an electrically conducting layer in this order to form a cathode part on a surface of an anode substrate exclusive of the anode part at one end, the anode substrate comprising a sintered body of a valve-acting metal or an electrically conducting oxide or comprising the sintered body connected with a metal wire, which is a chip solid electrolyte capacitor obtained by horizontally laying the plurality of electrolyte capacitor elements in parallel with no space on a pair of oppositely disposed end parts of a lead frame such that the anode part and the cathode part come into contact with the lead frame, joining each element, and molding the entirety with a resin while leaving outside the external terminal parts of the lead frame, wherein the volume ratio of one sintered body exclusive of the anode part to the chip volume is from 0.042 to 0.110.

2. The chip solid electrolyte capacitor as claimed in claim 1, wherein the anode part comprises the distal end of the anode substrate.

3. The chip solid electrolyte capacitor as claimed in claim 1, wherein the anode part comprises the metal wire connected to the sintered body.

4. The chip solid electrolyte capacitor as claimed in claim 3, wherein the metal wire is selected from the group consisting of tantalum, niobium, aluminum, titanium, alloys mainly comprising such a metal, and these metals and alloys which are partially oxidized and/or nitrided.

5. The chip solid electrolyte capacitor as claimed in claim 4, wherein the valve-acting metal, alloy or electrically conducting oxide is subjected to at least one treatment selected from carbidation, phosphation, boronation, nitridation and sulfidation.

6. The chip solid electrolyte capacitor as claimed in claim 1, wherein the valve-acting metal or electrically conducting oxide is tantalum, aluminum, niobium, titanium, an alloy mainly comprising such a valve-acting metal or niobium oxide, or a mixture of two or more members selected from these valve-acting metals, alloys and electrically conducting oxides.

7. The chip solid electrolyte capacitor as claimed in claim 1, wherein the sintered body has a chemically and/or electrically etched surface.

8. The chip solid electrolyte capacitor as claimed in claim 1, wherein the boundary between the anode part and the part exclusive of the anode part of the anode substrate is insulated by an insulating resin.

9. The chip solid electrolyte capacitor as claimed in claim 1, wherein the dielectric oxide film layer mainly comprises at least one member selected from $Ta_2O_5$, $Al_2O_3$, $Zr_2O_3$ and $Nb_2O_5$.

10. The chip solid electrolyte capacitor as claimed in claim 1, wherein the semiconductor layer is at least one member selected from an organic semiconductor layer and an inorganic semiconductor layer.

11. The chip solid electrolyte capacitor as claimed in claim 10, wherein the organic semiconductor is at least one member selected from an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

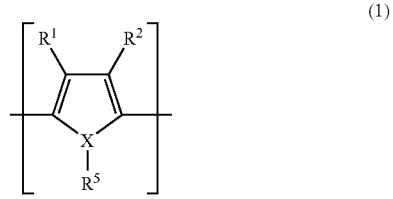

(1)

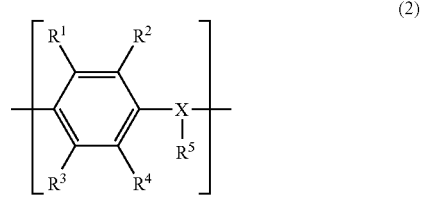

(2)

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a cyclic structure.

12. The chip solid electrolyte capacitor as claimed in claim 11, wherein the electrically conducting polymer containing a repeating unit represented by formula (1) is an electrically conducting polymer containing a structure unit represented by the following formula (3) as a repeating unit:

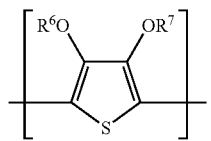

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position, and the cyclic structure includes a structure having a vinylene bond which may be substituted, and a phenylene structure which may be substituted.

13. The chip solid electrolyte capacitor as claimed in claim 11, wherein the electrically conducting polymer is selected from polyaniline, polyoxyphenylene, polyphenylene sulfide, polythiophene, polyfuran, polypyrrole, polymethylpyrrole, and substitution derivatives thereof.

14. The chip solid electrolyte capacitor as claimed in claim 12, wherein the electrically conducting polymer is poly(3,4-ethylenedioxythiophene).

15. The chip solid electrolyte capacitor as claimed in claim 10, wherein the inorganic semiconductor is at least one compound selected from molybdenum dioxide, tungsten dioxide, lead dioxide and manganese dioxide.

16. The chip solid electrolyte capacitor as claimed in claim 10, wherein the electrical conductivity of the semiconductor is from $10^{-2}$ to $10^3$ S/cm.

17. An electronic circuit using the chip solid electrolyte capacitor claimed in claim 1.

18. An electronic instrument using the chip solid electrolyte capacitor claimed in claim 1.

* * * * *